United States Patent [19]

Arpin et al.

[11] Patent Number: 4,750,136

[45] Date of Patent: Jun. 7, 1988

[54] COMMUNICATION SYSTEM HAVING AUTOMATIC CIRCUIT BOARD INITIALIZATION CAPABILITY

[75] Inventors: Lee J. Arpin, Middletown; Dennis D. Jurgensen, Belford; Philip W. Woo, Somerville, all of N.J.

[73] Assignee: American Telephone and Telegraph, AT&T Information Systems Inc., Morristown, N.J.

[21] Appl. No.: 817,723

[22] Filed: Jan. 10, 1986

[51] Int. Cl.⁴ .................... G06R 7/00; G06F 3/04; G06F 13/22
[52] U.S. Cl. .................... 364/514; 364/200; 340/825.08
[58] Field of Search .................. 364/200, 900, 514; 340/725.08; 379/284

[56] References Cited

U.S. PATENT DOCUMENTS

| | | | |
|---|---|---|---|
| 4,070,704 | 1/1978 | Calle et al. | 364/200 |
| 4,367,422 | 1/1983 | Leslie | 307/597 |
| 4,385,206 | 5/1983 | Bradshaw et al. | 379/284 |
| 4,562,535 | 12/1985 | Vincent et al. | 364/200 |
| 4,635,192 | 1/1987 | Coceon et al. | 364/200 |
| 4,660,141 | 4/1987 | Coceon et al. | 364/200 |
| 4,683,531 | 7/1987 | Kelch et al. | 340/825.08 |

Primary Examiner—Parshotam S. Lall
Assistant Examiner—Ellis B. Ramirez
Attorney, Agent, or Firm—John A. Caccuro

[57] ABSTRACT

A self-initializing communication system is described which automatically initializes circuit boards of the system using predetermined operating parameters when the system is initially powered-up or reset. The system is arranged to initialize circuit boards inserted in any order in any board slots of the system equipment housing. A malfunctioning circuit board can be replaced while the system is operating and the replacement circuit board is automatically initialized by the system using the stored operating parameters from the malfunctioning circuit board.

10 Claims, 6 Drawing Sheets

DATA FLOW GRAPH OF INITIALIZATION

FIG. 3

PHYSICAL DESCRIPTION TABLE (300)

|  | ID CODE (301) | SUFFIX (302) | VINTAGE (303) |
|---|---|---|---|
| BD1 | xxxx | xxxx | xxxx |
| BD2 | NO BOARD | xxxx | xxxx |
| BD3 | xxxx | xxxx | xxxx |
| ⋮ | ⋮ | ⋮ | ⋮ |
| BDN | xxxx | xxxx | xxxx |

DEFAULT OPTION TABLE (304)

|  | Bd FEATURES (305) | PARAMETERS (306) | OPTIONS (307) | SYS FEATURES (308) | FORMAT (309) |
|---|---|---|---|---|---|
| TP1 | xxxx | xxxx | xxxx | xxxx | xxxx |
| TP2 | xxxx | xxxx | xxxx | xxxx | xxxx |
| ⋮ | ⋮ | ⋮ | ⋮ | ⋮ | ⋮ |
| TPX | xxxx | xxxx | xxxx | xxxx | xxxx |

LOGICAL DESCRIPTION TABLE (310)

|  | LOGICAL BD TYPE | LOGICAL ADDRESSES OF PORTS ON BOARD |  |
|---|---|---|---|
| BD1 | xxxx | xxxx |  |
| ⋮ | GS | Pi to Pi + 7 | GROUND START TRUNK WITH 8 PORTS |
| BDN | xxxx | xxxx |  |

VALID BOARD TABLE

| ID CODE | /311 |
|---|---|
| ID1 |  |
| ID2 |  |
| ⋮ |  |
| IDK |  |

DATA FLOW GRAPH OF INITIALIZATION

FLOWCHART OF BOARD
CONFIGURATION MANAGER

INIT AT FLOW CHART

COMMUNICATION SYSTEM HAVING AUTOMATIC CIRCUIT BOARD INITIALIZATION CAPABILITY

FIELD OF THE INVENTION

This invention relates to communication system initialization and, more particularly, to a method and apparatus for automatically initializing circuit boards of the system.

BACKGROUND OF THE INVENTION

During the installation of a communication system, circuit boards are plugged into predetermined slots in an equipment housing. Some of these boards may require initialization by the user. The circuit board initialization process involves the user manually loading various parameters into circuit boards and/or the booting of programs into the board before that board or the system can be placed in service.

Additionally, when a circuit board of a communication system malfunctions, it must be replaced, sometimes requiring the user to power-down the system. Moreover, this replacement board must also be manually initialized by the user after being inserted into the equipment housing.

What is desired is a self-initializing communication system whereby each circuit board is automatically initialized when the system is powered. Additionally, it is desired that when a circuit board is replaced in an operating system, the replacement circuit board be automatically initialized by the system.

SUMMARY OF THE INVENTION

According to the present invention, a self-initializing system and method are described for automatically initializing circuit boards of the system in response to predetermined conditions. More particularly, when power is applied or in response to a reset signal, each circuit board systematically reports its identification type (ID) code to the system controller which then accesses options tables in memory using the board ID code to obtain predetermined operating parameters which are sent to and which define one or more features to be performed at the associated circuit board. Additionally, the present self-initializing system initializes circuit boards which are inserted in any order in any of the board slots of the equipment housing. According to another aspect of the invention, a malfunctioning circuit board is replaceable while the system is operating and the replacement circuit board is automatically initialized by the system using the stored operating parameters associated with the replaced circuit board.

BRIEF DESCRIPTION OF THE DRAWING

The characteristics and operation of the present invention will be more apparent from the following detailed description taken in conjunction with the drawing in which:

FIG. 3 shows various tables which store information utilized by the programs of the present invention;

GENERAL DESCRIPTION

Figure 1:
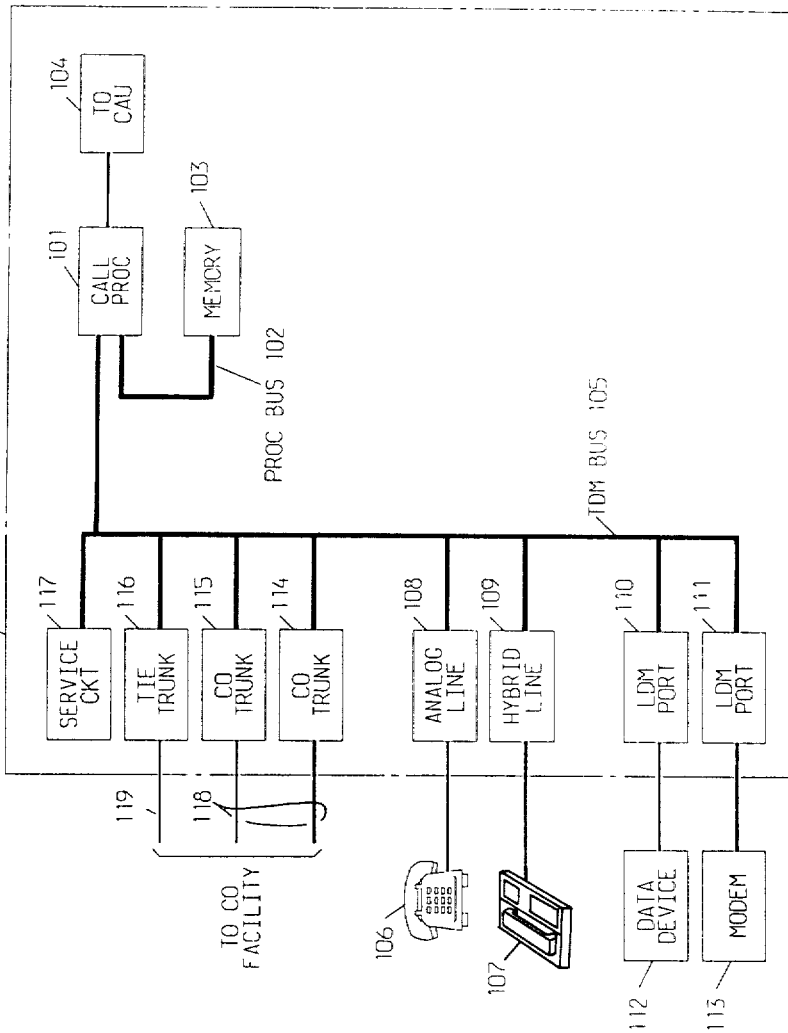
FIG. 1 is a block diagram of a telephone communication system useful for describing the present invention.

Referring to FIG. 1, there is shown an illustrative private branch exchange (PBX) communication system 100 useful in describing the present invention. The system 100 controls call processing between any of the trunks (e.g., 118), station sets (e.g., 106), or devices (e.g., 112) connected to the system ports (108-111, 114-117). The system controller includes a central call processor unit (CPU) 101, which connects over a processor bus 102 to read-only memory (ROM) 103. The ROM 103 stores the system call processing programs, including the programs utilized by the present invention. A customer access unit (CAU) 104 enables a customer to administer CPU 101 and system 100. The CAU 104 also enables a customer to manually input or change the operating parameters of the system ports. The CPU 101 communicates over a time division multiplexer (TDM) bus 105 to a plurality of intelligent port circuits (108-111, 114-117). System 100 has a distributed switching network architecture whereby some of the common circuitry is incorporated into the microprocessor controlled port circuits.

The port circuits may include a variety of line circuits, for example, analog line circuit 108 for interfacing analog telephone 106, hybrid line circuit 109 for interfacing hybrid telephone 107, or digital line circuits or modems 110, 111 for interfacing to data devices 112, 113. The port circuits may also include a variety of trunk circuits, such as central office trunk circuits 114, 115 for interfacing to central office (CO) lines 118 or tie trunk circuit 116 for interfacing to tie trunk 119. Additionally, the port circuits may include a variety of service circuits, such as 117, which provide tone/clock generation, tone detection, speech synthesis, etc., for the system.

The communication system 100 is housed in an equipment housing having board slots wired so that any port board can plug into any board slot. As well be described in a later paragraph, system controller (CPU 101 and memory 103) associates a particular port board with a board slot location after receiving a port board report during a restart condition.

Figure 2:
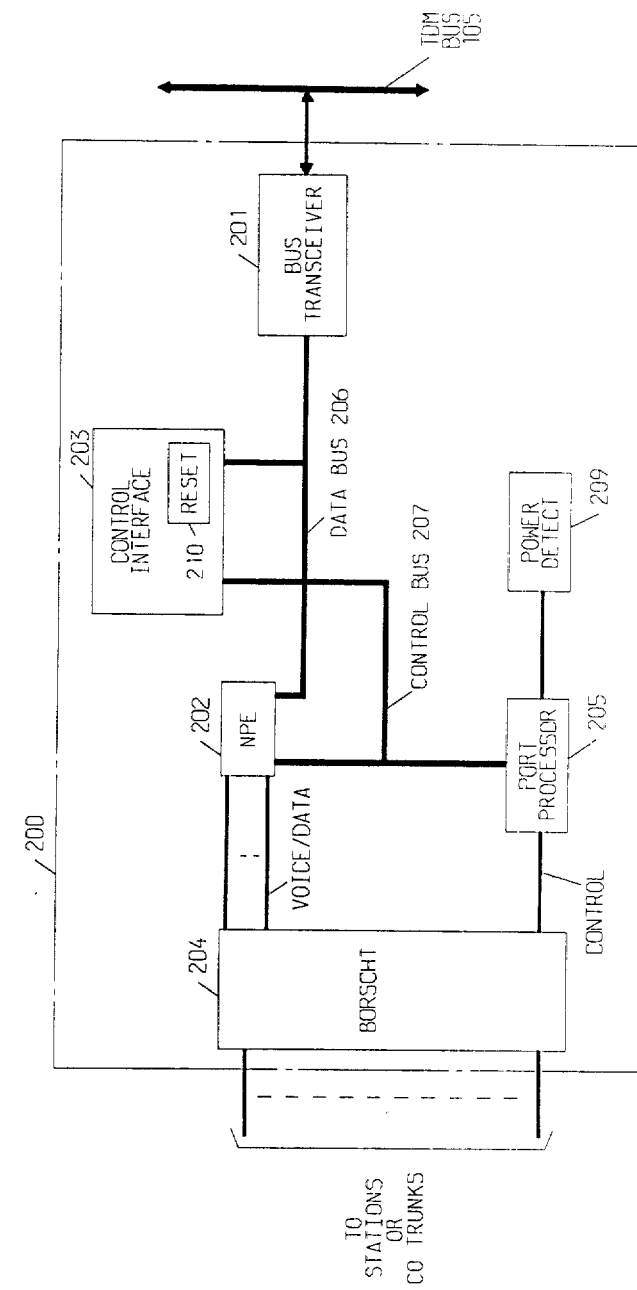
FIG. 2 is a block diagram of a port circuit utilized in the system of FIG. 1.

Shown in FIG. 2 is a generic block diagram of an intelligent port circuit 200 which may be utilized with the present system. These port boards may be of the type described on page 162 of the article entitled "System 75: Communications and Control Architecture" by L. A. Baxter et al (*AT&T Technical Journal*, January 1985, page 153).

Bus transceiver 201 interfaces the port circuit 200 to TDM bus 102. The time-slot information from TDM bus 102 includes control information and data. The data may be either digitized pulse code modulation (PCM) voice samples or digital data. These data are converted to and from the TDM format by network processing element (NPE) 202. A control interface 203 connects to NPE 202 and control interface 203 via data bus 206. Control interface 203 receives control information from TDM bus 102 and controls data flow over data bus 206. Circuit 204 provides the Battery feed, Overvoltage protection, Ringing, Supervision, Codec, Hybrid and Testing (BORSCHT) functions and signals necessary to interface to a particular type of line or trunk.

Port microprocessor 205 includes ROM and RAM circuits and performs functions common to all port circuits and specific-application functions which are unique to a particular type of port circuit. Microprocessor 205 communicates with NPE 202 and control interface 203 via control bus 207. Microprocessor 205 carries out the port circuit's particular function and enables it to communicate with system CPU 101.

The port circuit's particular operating characteristics are defined by specific operating parameters which are inputted during the automatic initialization process according to the present invention and which may be modified by the user using CAU 104 of FIG. 1. These operating parameters are stored in RAM of port microprocessor 205.

Each port circuit does real-time port scanning of external stimuli of the connected line or trunk and reports particular changes to CPU 101. The port circuit reaction to changes in external stimuli may also be dependent upon the operating parameters provided during the initialization process. Communications between each port circuit and CPU 101 occurs over TDM bus 105. Generally, CPU 101, in response to line or trunk status signals received from a port circuit, generates and sends a control signal to one or more port circuits specifying the appropriate system response to a received stimulus. The two-way communications and the distributed processing capability of each port circuit are utilized with the present invention to enable automatic initialization and re-initialization of the port circuits. Multiple port circuits are arranged on port boards which plug into an equipment housing along with boards containing CPU 101 and memory 103.

Initialization of a port board occurs in response to predetermined conditions defined as a "cold start". A cold start occurs during the initial power-up or in response to a reset signal from CPU 101. At each port board, these predetermined conditions are generated by a power detect circuit and a reset circuit, illustratively shown in FIG. 2 as 209 and 210, respectively. When operating power is applied to port board 200, power detect circuit 209 causes port microprocessor 205 to initialize the port board 200. During the initialization process at a port board, microprocessor 205 runs sanity tests to verify the correct operation of the port circuits thereon. Additionally, each port board includes means for reporting to CPU 101 the model type or ID code of the port board and the results of the sanity test. These reports from the port boards also enable CPU 101 to configure itself, that is, determine the type of port boards in the system and to associate each port board with a board slot in the equipment housing.

Moreover, when port board 200 receives a reset message from CPU 101, reset circuit 210 causes port microprocessor 205 to initialize and send a report to CPU 101 identifying the model type or ID code of port board 200. As will be discussed in a later paragraph, CPU 101, in response to a report from a port board, sends predetermined default operating parameters to the reporting port board. The port microprocessor 205 utilizes the operating parameters to set up particular communication characteristics for the port circuits. These operating parameters may specify, for example, whether the trunk or line is to operate in a ground-start or loop-start mode, the dial type (whether rotary or touch tone) to be utilized, the logical numbering of each port circuit on a port board, etc.

DETAILED DESCRIPTION

In accordance with the present invention, the general operation of the automatic port-board initialization process proceeds as follows. The automatic port-board initialization capability described herein enhances the system maintenance features which already exist in the port boards described in the previously referenced L. A. Baxter et al article. These existing maintenance features are described on page 237 and other pages of the article entitled "System 75: Maintenance Architecture" by K. S. Lu et al (*AT&T Technical Journal*, January 1985, page 229). Thus, system 100 automatically detects the removal and insertion of port boards. Removed boards are taken out of service and communications thereto are prevented until a new port board is inserted, initialized and activated.

The initialization process includes automatically installing default translations in each port board upon initial power-up using default operating parameters which CPU 101 obtains from a Default Options Table. (The term "translate" means to convert a board type designation into the appropriate operating parameters for the features and options of that type of board and to store it in a table.) CPU 101 also checks that each port board is a valid port board type for this system. The CPU 101 then activates the port circuit boards after default translation.

The initialization process also includes the initializing and activation of any replacement port circuit board which replaces a malfunction port board in an operating system. During this process, CPU 101 checks that the replaced port board is the same type as the board it is replacing based on the logical board type stored in the Logical Description Table and then sends it operating parameters.

The automatic initialization capability enables a turn-key operation of a PBX, i.e., once it is powered up for the first time, it automatically configures itself and initializes all circuit boards. The system accomplishes this using a translation database which is generated by the system from a built-in Default Options Table. Once the initial system power-up is accomplished or after a circuit board is replaced and assuming connections are made or maintained to terminals and outside lines, then calls can be made through the PBX. The present invention eliminates the tedious task of having the user install a translation database, which requires enabling or disabling features for every port on every board as well as selecting options for each board in the system. In the case of the replaced circuit board, the present invention eliminates the need for a user to manually initialize and activate newly installed boards. Moreover, since these capabilities of the present invention are totally table-driven, it makes database modification easy.

The present invention is utilized in a PBX system having a distributed processing architecture, that is, where each circuit board has its own processing capability and operates under control of the system controller (CPU 101) and a common translation database. It should be understood that the present invention could be utilized with other systems having a similar distributed processing architecture. Moreover, since such systems utilize a variety of hardware and programming techniques, no attempt is made to describe the programs used to control the communication system. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the tables of FIG. 3 and the block diagrams of FIGS. 4–6 which describe the logical steps and the various parameters required to implement the present invention.

With reference to FIG. 3, the program implementation of the present invention utilizes four tables to provide the automatic circuit board initialization for the system. These are the Physical Description Table 300, Default Options Table 304, Logical Description Table 310, and Valid Board Table 311.

Figure 4:
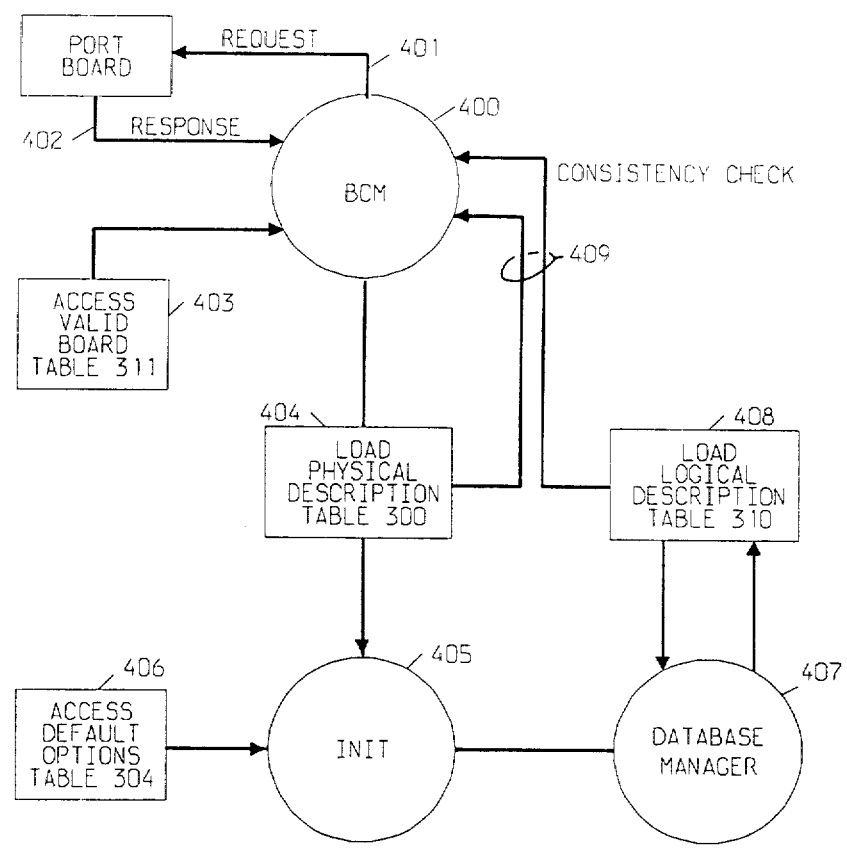
FIG. 4 shows an overall block diagram which illustrates the operation of the programs and tables utilized by the present invention.

With reference to FIG. 4, the program is divided into two modules, the Board Configuration Manager (BCM) and the Initialization Routine (INIT). INIT program uses the Valid Board Table 311, Physical Description Table 300 and Default Options Table 304 to control the loading of Logical Description Table 310. The program BCM basically performs comparisons between Physical Description Table 300 and Logical Description Table 310 to control the initialization and activation of port boards.

Since the programs of the present invention are implemented as table-driven processes, we first discuss the format of these tables and the information contained in each one before describing the program modules which generate and use this information.

With reference to FIG. 3, the Physical Description Table 300 contains an entry for each board position (BD1-BDN) in the system. Each board entry contains three pieces of information—board ID code 301, board suffix 302, and board vintage 303. For the present invention, the most important piece of information is the board ID code. All board positions in the equipment housing which are empty have a board type code set equal to a "no board" status by the BCM program (e.g., see BD2). For occupied board slots, BCM loads the board ID code into the associated table position. If a board is plugged-in, which is not allowable in system 100, an alarm signals the user of this condition and the "no board" status is entered into Physical Description Table 300. The board suffix and board vintage information are application-dependent and are not applicable to the present discussion; they are used to accommodate different versions of a particular board type.

The Default Options Table 304 is the key table in the initialization process. The table contains a list of all board types which are to be initialized by the system. Default Options Table 304 contains default options for all types of circuit boards (TPI-TPX) utilized in system 100. In a PBX system, there are often a number of features that can be provided by the system. Some of the features can be turned on or off while other features require user-specified parameters to control the characteristics of that particular feature. For each type of allowable board, there is a list of all board features 305 which are to be enabled as well as specific parameters 306 for feature control. In addition to this data, there are entries which modify the operation of that particular board and are called board options 307. Note, while the present invention is directed to initializing port boards using board options 307, other characteristics, including 305, 306, 308 and 309, could be loaded during the initialization process.

Note, all boards of a specific type need not be translated exactly the same. Default Options Table 304 is flexible enough to provide different board feature sets 305 for boards having the same board type. This allows one group of boards to have one set of features while other groups of the same type of boards have completely different features or to have either a sub-set or super-set of the same features.

Some features have a system-wide effect and, once enabled or disabled, they are then enabled or disabled for the entire system. There is an entry in Default Options Table 304 for these kinds of system features 308 in addition to circuit board-specific features 305.

For each board type, there may be additional format information 309 stored to allow the INIT program to format commands to the database manager.

Logical Description Table 310 lists the logical address of each port circuit (P1-PY) of each port board of the system. As previously noted, the operating parameters stored in this table result from the translation of board type information of Physical Description Table 300 using the Default Options Table 304. For instance, for a trunk port ID code of 701, the Default Options Table would contain port default options, which trunk pool the trunk belongs to, whether or not it has dial access, etc.

Valid Board Table 311 lists the various types or IDs of all port boards which can be utilized in and supported by the system. When BCM receives an ID code from a port board, it matches the code against the Valid Board Table 311. If a match is found, the code is stored in the Physical Description Table 300 entry corresponding to the slot in which the port board resides. If the match fails, the board will be rejected.

In the following description, references will be made to numbered elements in figures. A numbered element is located in the figure which has the same first digit as the numbered element. Thus, numbered element 401 is located in FIG. 4.

With joint reference to FIGS. 1, 3 and 4, the overall operation of the present invention is described. When the system of FIG. 1 is initially powered-up, communications are established between call processor CPU 101 and the port boards. This occurs when each board reports its presence to CPU 101. CPU 101 then calls Board Configuration Manager program (BCM) 400, resident in ROM 103, which sends board identification requests to each physical board location 401. Note, if a port board is present at that location, it responds; but if a non-intelligent board or no board is present, no response is received by BCM 401. Each port board then responds, 402, with prestored type identification information (e.g., board ID 301 and possibly board suffix 302 and board vintage 303 data, if desired) which identifies important board identification parameters. The BCM checks, 403, if each board is a valid board in Valid Board Table 311. If not, an error message is outputted to the user. If it is a valid board, then BCM 401 stores, 404, these board identification parameters as an entry for that board position in Physical Description Table 300. Note, according to the present invention, any board can be placed in any board position or slot in the equipment housing and it can be initialized. When no intelligent board or no board is present at a board location, BCM 401 stores a "no board" status in the associated physical board position of Physical Description Table 300.

The above process continues for each physical board location in the system. Once the process is completed, control passes to the Initialization program (INIT) 405, which translates the boards according to information in the Physical Description Table 300. Program INIT accesses, 406, information in Default Options Table 304, which specifies the default options (such as dialing format, timing, amplifier gain setting) for different types of port boards. Program INIT uses the default options to generate formatted commands which are sent to Database Manager (DBM) 407. The operation of DBM is well known and consists of loading information received from BCM into Logical Description Table 310. For each command, DBM 407 stores, 408, the option information for each port in Logical Description Table 310. Note, since a port board may have one or more port circuits thereon, each port location in Logical Description Table 310 must be translated (i.e., loaded with the proper option information) by DBM 407. This port information from Logical Description Table 310 is then loaded by BCM into the ports of each port board and each port board is activated. After this translation process is completed, control returns to CPU 101.

If for some reason the translation or option information stored in Logical Description Table 310 becomes corrupted or erroneous as determined by a check sum error of entries in that table, CPU 101 sets the restart flag and sends a reset signal to each port board. As a result of the reset signal, each port reports its presence to CPU 101. CPU 101 then calls BCM and the process of FIG. 4 is repeated as though it were an initial power-up situation. Thus, cold starts include both the initial power-up and corrupted translation situations.

Additionally, when a port board is replaced while the system is in an operating mode, that board reports its presence to CPU 101. CPU 101 then calls BCM which requests, 401, board type information from the new port board. The new port board's response, 402, and board ID information is checked, 403, in Valid Board Table 311. This information is then compared, 409, against the information stored in Logical Description Table 310 for consistency. If BCM 401 determines that the new replacement port board is consistent with or the same type as the replaced port board, the translation is loaded into the new port board and it is activated. If BCM 401 determines that the new port board is different from the replaced port board, an error message is output to the user.

Figure 5:
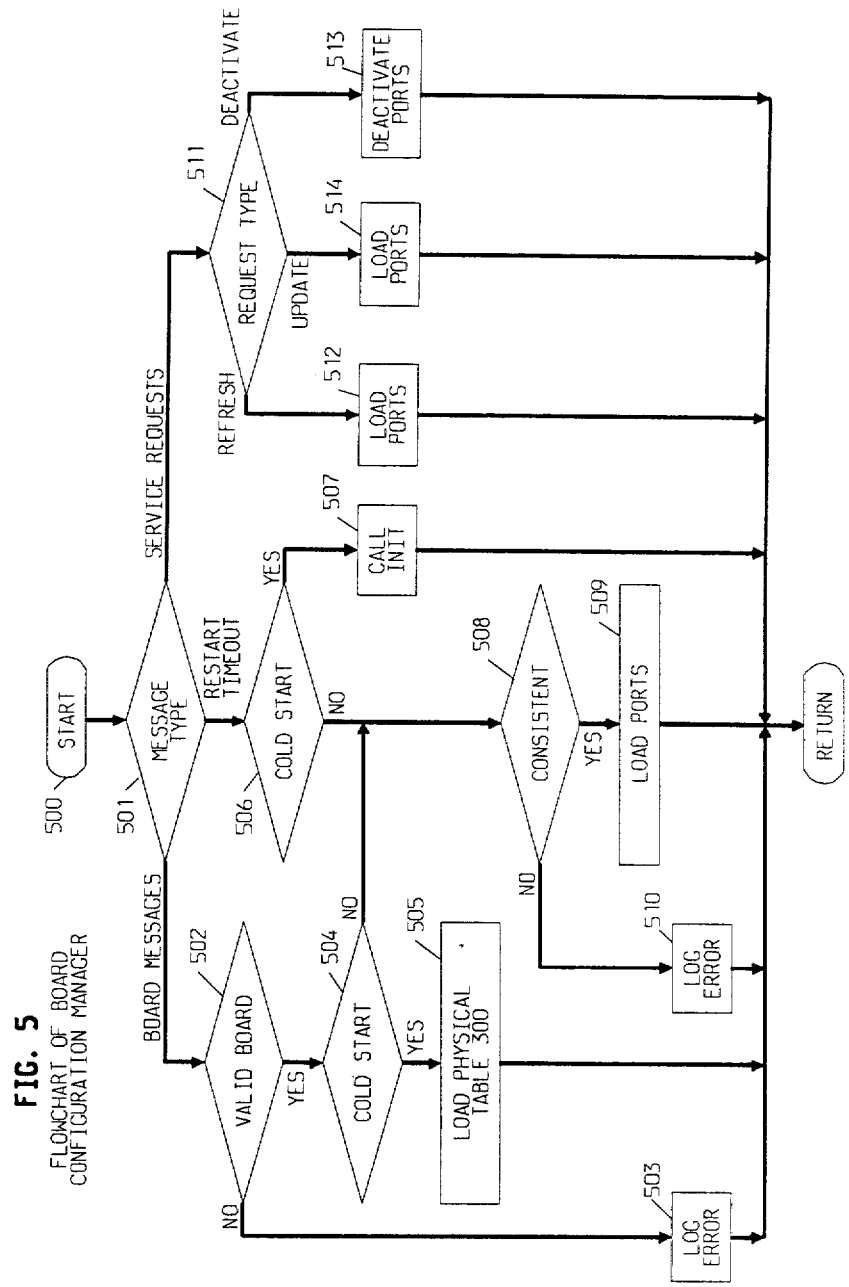
FIG. 5 shows the flow chart of the board configuration manager program utilized by the present invention.

With reference to the flow chart of FIG. 5, the detailed operation of BCM 401 is described. Program BCM is called, 500, by CPU 101 when either the system is initially powered-up or when a replacement circuit pack is plugged into a running system. It receives three types of call messages: port board messages, restart timeout messages, or board service requests. Port board messages are received by BCM when either the system is restarted or when a port board is replaced. CPU 101 receives this message from a port board and redirects the message to BCM. A restart timeout message is sent by CPU 101 whenever a specified system restart interval has elapsed. A restart occurs when (1) power is applied to the system or (2) power is restored after a power failure has occurred. Board service request messages are sent by other system programs which require port board or port-related functions.

When a board message is received by BCM, it validates the message by checking, 502, the board type information therein against entries in Valid Board Table 311. Valid Board Table 311 has a list of all valid boards which can be used with the system, which includes port boards, memory boards, etc. (By contrast, Default Options Table 304 lists only port boards.) If the board is not a valid board, an error message is outputted to the user in step 503 and BCM returns control to CPU 101.

If the board is a valid board, BCM checks, 504, if the system restart flag is set indicating a cold start. If a cold start, BCM loads Physical Description Table 300 and returns control to CPU 101. All board type messages during cold start go through this procedure until all of the boards plugged into the system have been entered in Physical Description Table 300.

When a port board is plugged into a running system, board type message is received in step 501 and validated in step 502. In step 504, since the system is running, it is not a cold start and a consistency check is made in step 508. As previously described, this consistency check is made between Physical Description Table 300 and Logical Description Table 310. If it is consistent, meaning that the information in Logical Table 310 matches the information which is associated with that type of port board, the port option information from Logical Table 310 is loaded into the port in step 509. Logical Table 310 includes information on each port specifying line, trunk, or station type information (e.g., ground start or loop start trunk). If inconsistent therein, an error message is outputted to the user in step 510 and BCM returns control to CPU 101.

When a restart timer expires, BCM receives a restart timeout message. The restart timer indicates that all port boards should have reported-in within a predetermined time period. In step 506, BCM checks if the system restart flag was set indicating a cold start. If not a cold start (i.e., warm start), the system checks, 508, for each port board, if the information in Physical Description Table 300 is consistent with Logical Description Table 310. If consistent, ports are loaded, 509; otherwise, an error message is outputted, 510. If a cold start, the Initialization program (INIT) is called in step 507. As will be described in a later paragraph, the INIT program basically instructs the Database Manager to translate valid board type information in Physical Description Table 300 into features and option information which is loaded into Logical Description Table 310 and in the appropriate port boards and ports thereon. Control then returns to CPU 101.

Returning to step 501, there are three types of service requests. First, there is an update of port board options. Second, there is a refresh of port board options. Third, there is a deactivation of port board requests. The refresh requests are made periodically by background maintenance software in order to ensure the integrity of port board operating parameters. By comparison, the update request occurs when a user wants to change one or more parameters on a port board or port thereon. Deactivation occurs when a user wants to remove a port or the system detects a malfunction of a port board or a port thereon.

In step 511, if the request type is a refresh request, the port board or a port thereon is loaded, 512, with the information from Logical Description Table 310. If the request is an update request, the port board or a port thereon is loaded, 514, with the latest updated information from Logical Table 310. If the request is a deactivate port request, a deactivate port message is sent, 513, to the appropriate port and port board, thereby preventing further communication between the deactivated port and CPU 101. Thereafter, control returns to CPU 101.

Figure 6:
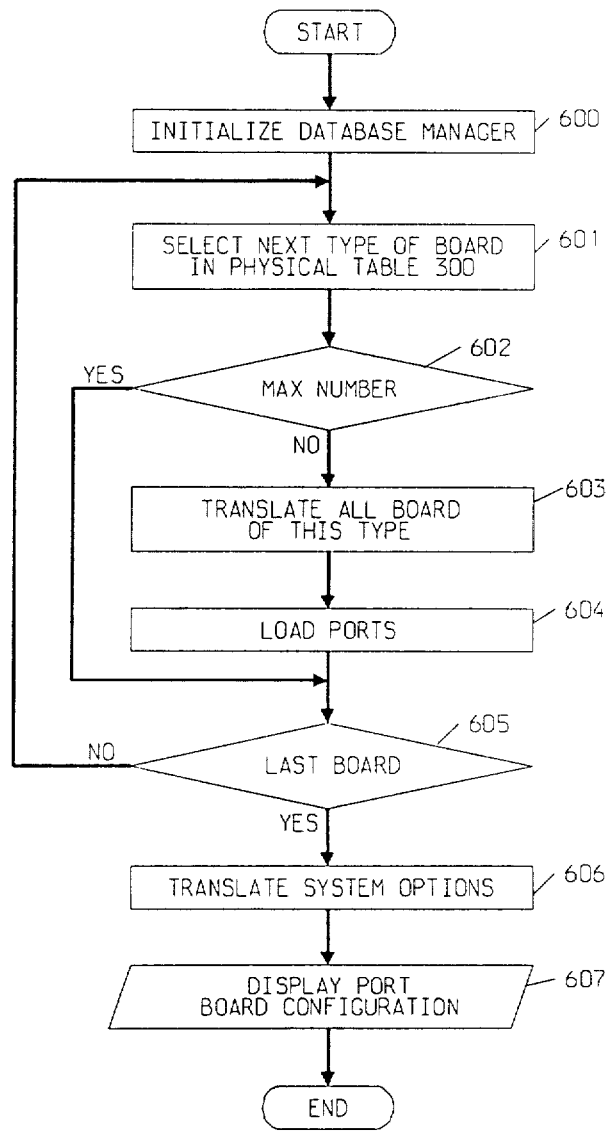
FIG. 6 shows the flow chart of the program which initializes the port circuits in accordance with the present invention.

With reference to FIG. 6, a more detailed description of program INIT is described. When INIT is first called in step 600, the Database Manager 407 is initialized. This initialization enables the Database Manager to receive formatted commands from the INIT program. In step 601, for each type of board in Physical Description Table 300, the INIT program checks Default Options Table 304 to obtain the parameters (information) for that particular type of port board.

For each type of board listed in Physical Description Table 300, the INIT program checks each physical board location in the system, thereby counting the number of each type of board in the system. In step 602, INIT program compares the number of boards of each type against a predetermined maximum number of boards of each type permitted in the system. Since the system cannot accommodate more than this predetermined maximum of boards of a particular type, the system ignores any of the remaining boards of this type which are plugged into the system. If this maximum count is equaled, INIT then checks, 605, if the board type was the last board in Physical Description Table 300. Assuming it is not, INIT moves on to select, 601, the next board type. If this number is not exceeded, INIT proceeds to translate all boards of this type in step 603. The INIT program then inserts Default Options Table 304 information into a formatted command to Database Manager. Then INIT calls the Database Manager to execute these commands.

The Database Manager then sends load port commands, 604, to each port board of this particular board type, thereby setting options and activating the port boards. The INIT program then checks, 605, if the last board type has been translated. If not, it selects, 601, the next board type. When each board in the system has been translated, the INIT program proceeds, in step 606, to translate system options. System options or features are features which have system-wide effect—for example, the number of rings before an incoming call is transferred from the called station to a coverage station. The system options are sent only to port boards which require the information. Once all these system options are translated, the INIT program outputs to a user at CAU 104, in step 607, a table listing the final system configuration. This table may list, for each board position, the type of board located thereon, if a board has been removed, if a board can't be translated, or if a conflict exists between entries in the various tables. Control is then returned to CPU 101.

While the present invention was described for use in a PBX-type system, its application to other types of system is anticipated. Moreover, while the events which trigger the initialization sequence described herein are generated by, for example, the initial powering of the system, resetting of the system, or the powering of a replaced port board, obviously other trigger events could be utilized therewith without deviating from the teaching of the present invention.

What has been described is merely illustrative of an application of the principles of the present invention. Other methods, sequences or circuits can be used to implement the present invention by those skilled in the art without departing from the spirit and scope of the present invention.

What is claimed is:

1. A communication system comprising a controller connected to one or more port circuits for providing communications between trunks and lines connected to said one or more port circuits, said system further comprising:
   feature defining means at each of said port circuits for storing operating parameters defining a plurality of features which can be performed thereat, and
   reporting means at each of said port circuits responsive to a predetermined status condition therat for reporting its identification type code to said controller and
   said controller including
   memory means for storing predetermined operating parameters defining one of said plurality of features to be performed at each type of said port circuits connected to said system and
   means connected to said memory means and responsive to the receipt of said type code from each reporting port circuit for accessing said memory means using said type code and for sending predetermined operating parameters to said each reporting port circuit thereby defining one of said plurality of features to be performed therat.

2. The communication system of claim 1 wherein said predetermined status condition is responsive to a rest signal from said controller.

3. The communication system of claim 1 wherein said predetermined status condition results from the applicaiton of power to said system and said predetermined operating parameters for each of said one or more port circuits are default options.

4. The communication system of claim 1 wherein said reporting port circuit is inserted in said system replacing a port circuit of the same type which was removed from said system, the replacement occurring while said system is powered and wherein said predetermined status condition is responsive to power being applied to said reporting port circuit when said reporting port circuit is inserted in said system and wherein said predetermined operating parameters sent to said reporting port circuit are the operating parameters of the replaced port circuits.

5. The communication system of claim 1 wherein said controller further comprises
   means responsive to said reporting port circuit for outputting an error signal when the received port circuit identification type code is not one which is stored in said memory means.

6. The communication system of claim 1 wherein said controller further comprises
   means responsive to a signal received from said reporting port circuit for preventing the sending of said operating parameters to said reporting port circuit when the number of said one or more port circuits of that type execeed a predetermined number in said system.

7. The communicaiton system of claim 1 including an equipment housing having a plurality of board slots and wherein each of said one or more port circuits being adapted to be plugged into any of said plurality of board slots in any order.

8. The communication system of claim 4 wherein said predetermined status condition is responsive to a reset signal form said controller.

9. A port circuit initialization arrangement for use in a communication system comprising a controller connected to one or more port circuits for providing communications between trunks and lines connected to said one or more port circuits, said port circuit initialization arrangement comprising
- feature defining means at each of said port circuits for storing operating parameters defining a plurality of features which can be performed thereat, and
- reporting means at each of said port circuits responsive to a predetermined status condition thereat for reporting its identification type code to said controller and
- memory means in said controller for storing predetermined operating parameters defining one of said plurality of features to be performed at each type of said port circuits connected to said system and
- means in said controller connected to said memory means in said controller connected to said memory means and responsive to the receipt of said type code from each reporting port circuit for accessing said memory means using said type code and for sending predetermined operating parameters to each reporting circuits thereby defining one of said plurality of features to be performed thereat.

10. A method of self-initializing a communication system comprising a controller connected to one or more port circuits for providing communications between trunks and lines connected to said one or more port circuits, said method comprising
- storing in a system memory predetermined operating parameters according to port circuit type code, said predetermined operating parameters defining a plurality of features which can be performed by each port circuit in the system;
- reporting to said controller when a predetermined status condition exists at a port circuit, said report specifying the type code of said reporting port circuit;
- controller accessing of said system memory to obtain the stored predetermined operating parameters using said reporting port circuit type code specified in said reporting step;
- sending said predetermined operating parameters from said controller to said reporting port circuit; and
- receiving and storing said predetermined operating parameters defining one of said plurality of features to be performed by said reporting port circuits.

* * * * *